United States Patent [19]

Braillon

[11] Patent Number: 4,679,021

[45] Date of Patent: Jul. 7, 1987

[54] MAGNETIC RETENTION PLATE WITH PERMANENT MAGNETS

[75] Inventor: Philibert M. Braillon, Montmelian, France

[73] Assignee: Braillon & Cie (Societe Anonyme), Montmelian, France

[21] Appl. No.: 876,920

[22] Filed: Jun. 20, 1986

[30] Foreign Application Priority Data

Jul. 3, 1985 [FR] France ................ 85 10682

[51] Int. Cl.$^4$ ............................................. H01F 7/04
[52] U.S. Cl. ................................. 335/295; 335/285
[58] Field of Search ............. 335/285, 286, 287, 288, 335/295

[56] References Cited

U.S. PATENT DOCUMENTS 4,468,648  8/1984  Uchikune ........................... 335/295
4,468,649  8/1984  Matsuhashi ....................... 335/295
4,575,702  3/1986  Nitta et al. ....................... 335/295 X Primary Examiner—George Harris
Attorney, Agent, or Firm—Karl F. Ross; Herbert Dubno

[57] ABSTRACT

Longitudinal and transverse rows of pole piece are flanked by pairs of rows of fixed permanent magnets in one direction and by movable permanent magnets in another direction and are mounted on a magnetic or nonmagnetic base plate. An actuating mechanism for the movable permanent magnets enables the displacement thereof by one pole pitch so that in one position all four sides of each pole piece are flanked by magnetic poles of the same polarity so that the flux lines close through the active face of the magnetic retention plate. In the other position, pairs of permanent magnets confronting the opposite sides of the pole pieces are of opposite polarity so that flux line closure is entirely within the body of the plate.

6 Claims, 9 Drawing Figures

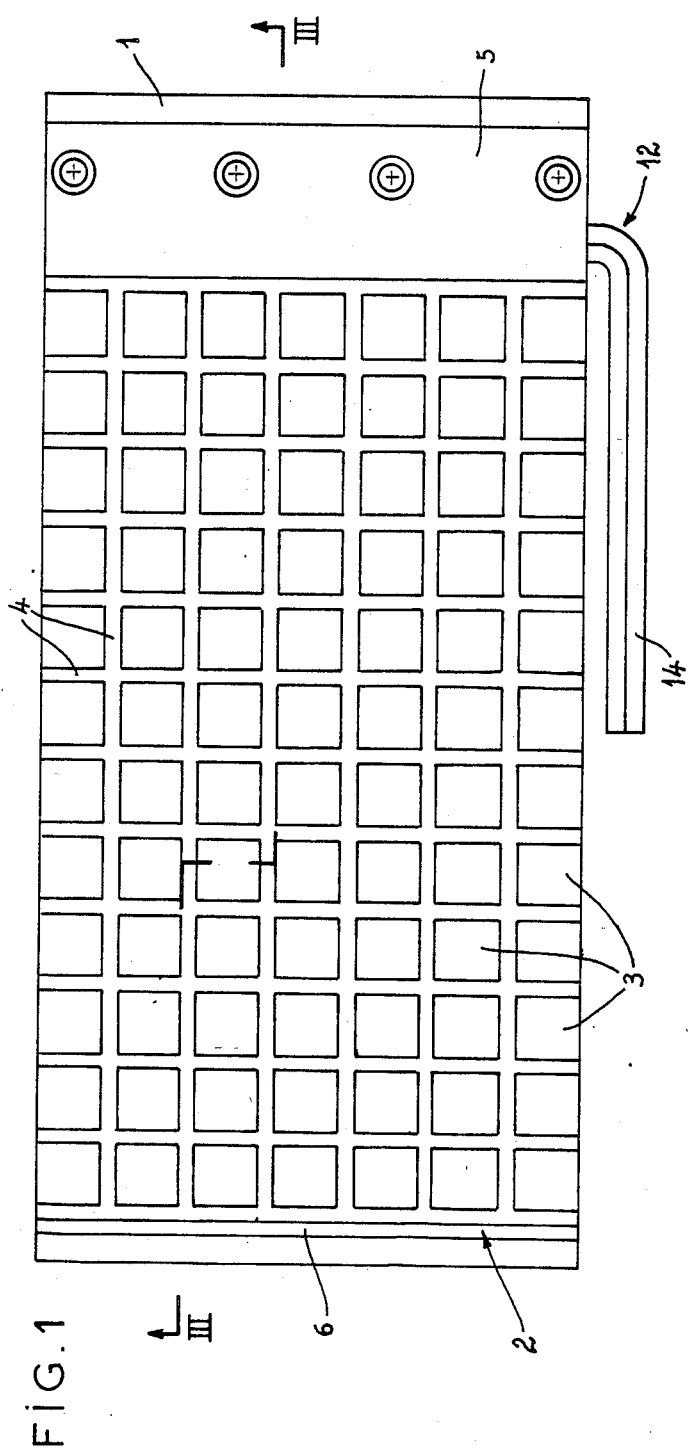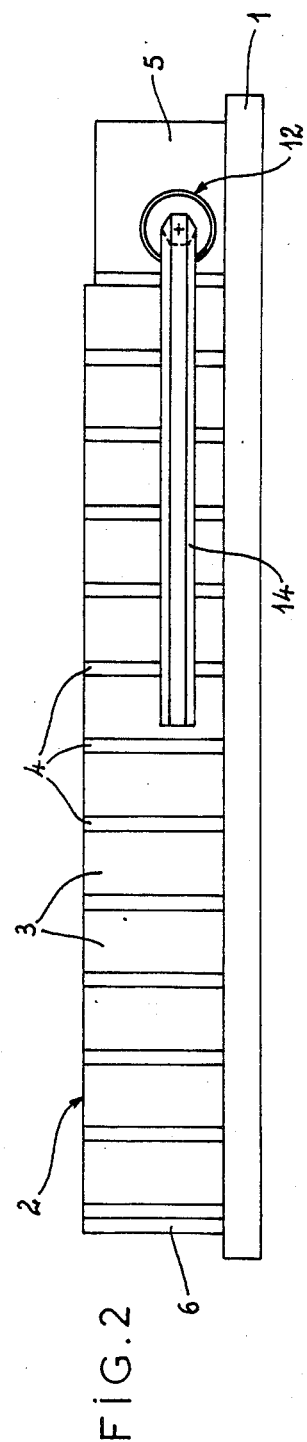

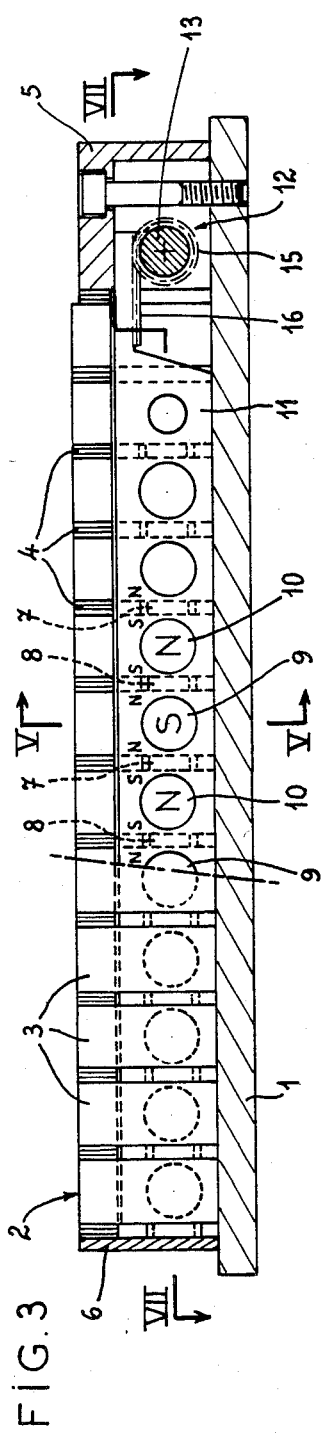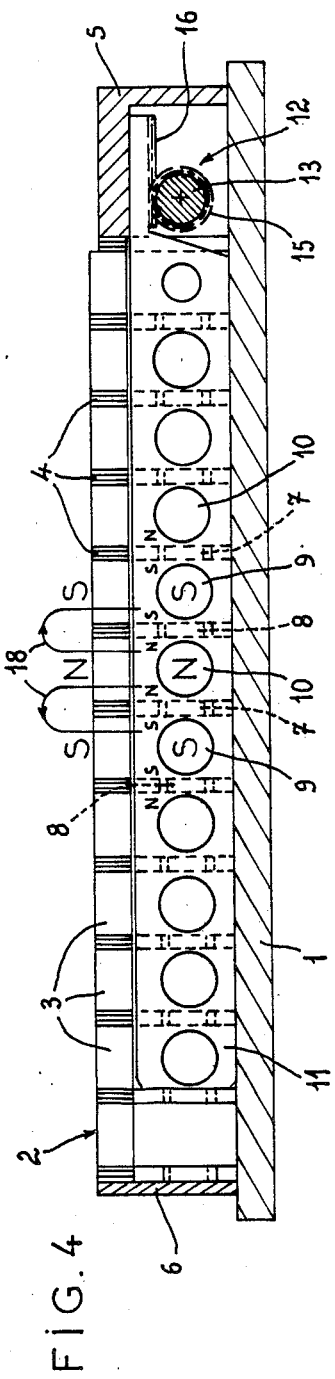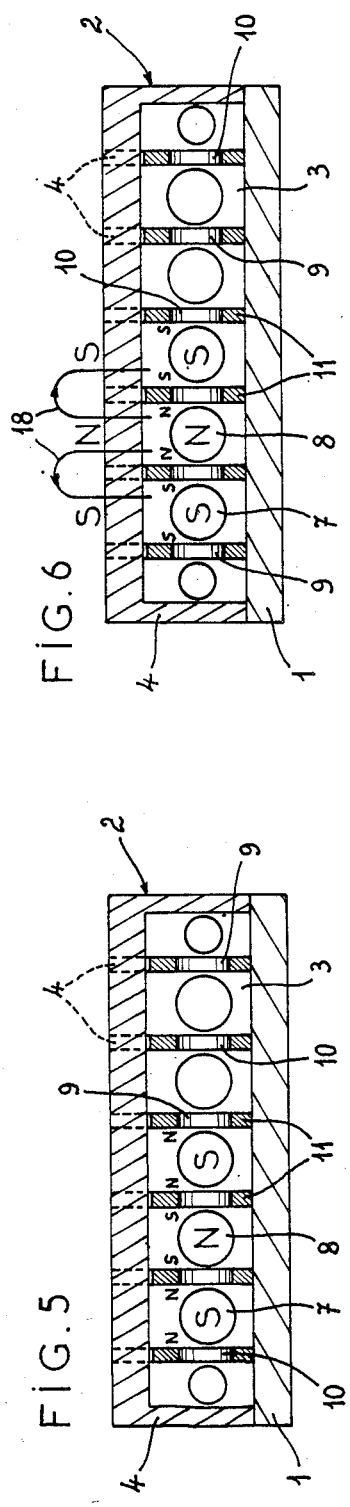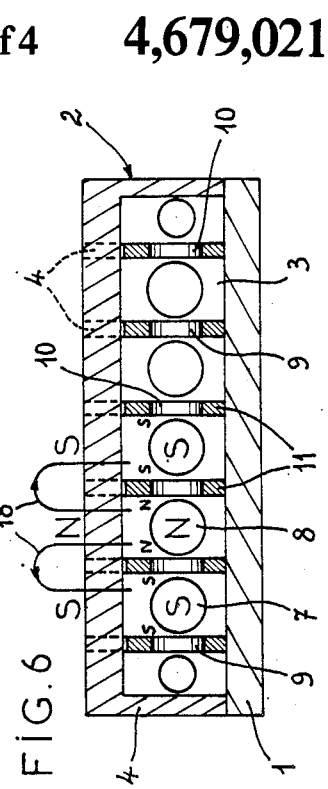

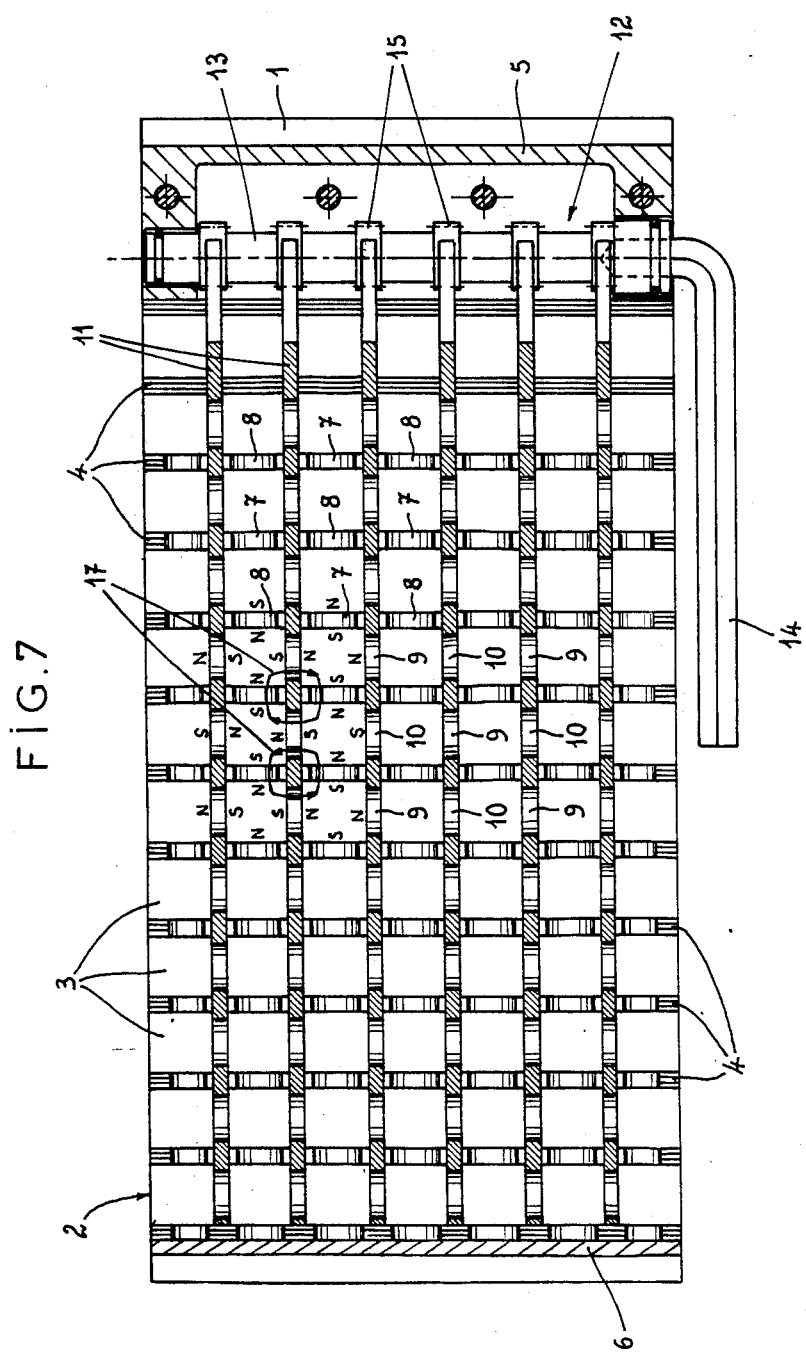

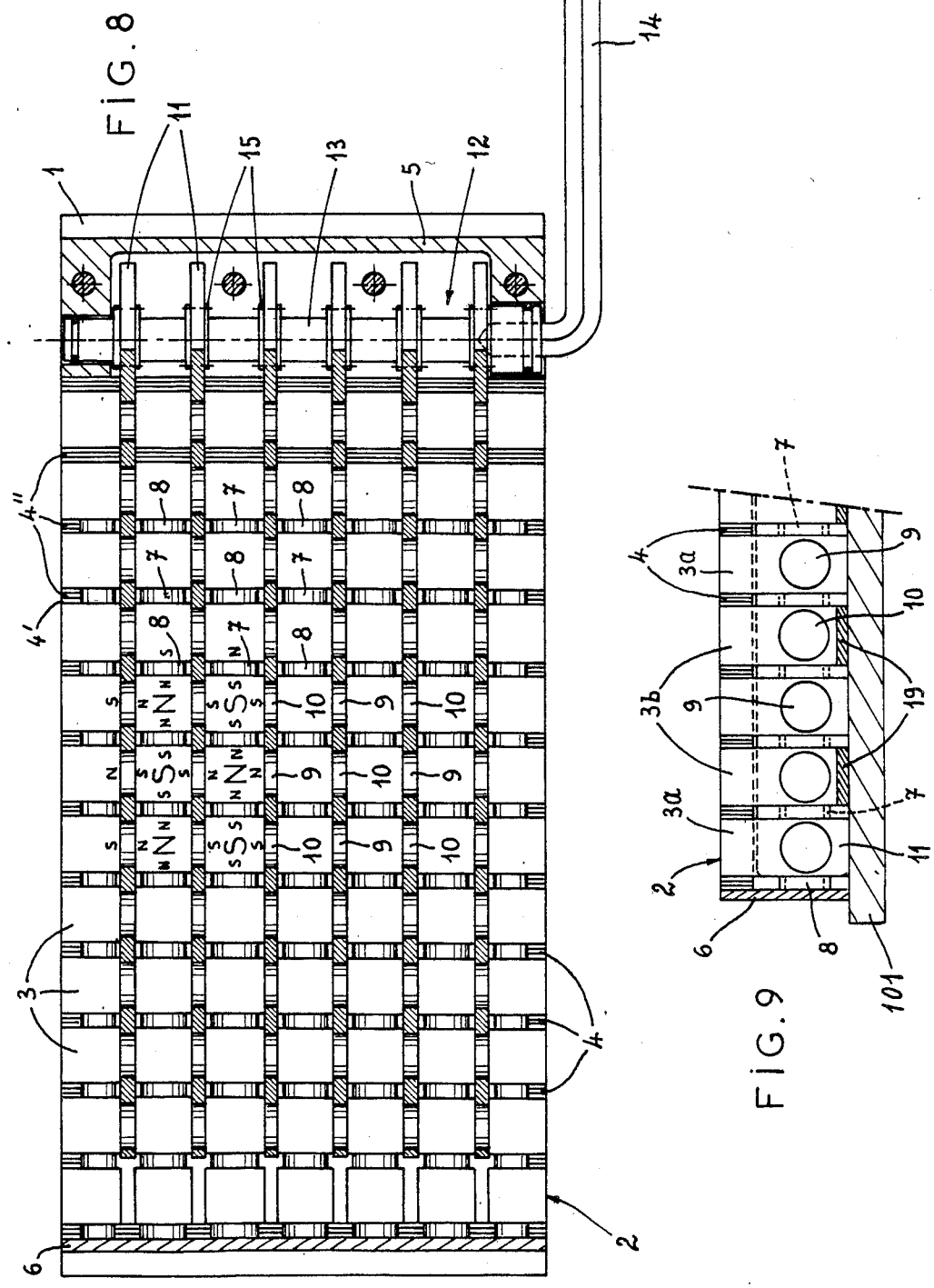

MAGNETIC RETENTION PLATE WITH PERMANENT MAGNETS

FIELD OF THE INVENTION

My present invention relates to a magnetic retention plate, using permanent magnets, provided with an actuating mechanism for switching over between retention and release states of the plate. Such plates are also referred to as magnetic chucks and magnetic worktables.

BACKGROUND OF THE INVENTION

Magnetic chucks and worktables, of the type with which the present invention is concerned, are commonly used to retain a workpiece during machining or other processing, the workpiece being composed generally of a ferromagnetic material or having magnetically attractable properties. In general such magnetic chucks and worktables, hereinafter referred to as magnetic retention plates for selectively retaining a magnetically attractable body, can comprise permanent magnets and an actuating mechanism which can shift pole pieces relative to the magnets, magnets relative to one another or other combinations of magnets, magnetically permeable members or magnetically insulating members to create a state at which a magnetic field appears at the surface of the magnetic retention plate to hold the body against this surface, or this magnetic field is nullified or attenuated to allow removal and replacement of this body on the surface.

In this connection mention may be made of the commonly owned U.S. Pat. Nos. 3,775,717, 4,379,277, 4,465,993, and 4,542,890 and the documents cited in the files thereof.

Of particular interest in the present invention is a magnetic retention plate of this type which comprises above a base plate or sole plate, an array of pole pieces separated by partitions so that the surface of the retention plate adapted to receive the magnetically attractable body is defined by the ends of the pole pieces and the edges of the intervening separators or partitions.

An array of fixed magnets magnetized in a common direction and an array of movable permanent magnets magnetized in a direction perpendicular to the aforementioned common direction are also provided.

The actuating mechanism can displace the array of movable magnets in translation between a first position in which the lines of force from all of the magnets are closed within the magnetic plate, and a second position in which the lines of force of all the magnets through the pole pieces can only close externally of the magnetic plate.

This particular type of magnetic retention plate is utilized to hold workpieces to be machined on the table of a machine tool, the permanent magnets creating at least one active face of the plate in the second position with an attractive force capable of retaining the workpiece against this face.

This type of magnetic plate in which the direction of magnetization of the movable magnets is perpendicular to the direction of magnetization of the fixed magnets is described in French patents No. 2,017,322 (see also U.K. patent specification No. 1,274,533) and No. 2,536,321 (see U.S. Pat. No. 4,468,649).

In the magnetic retention plates of this type which have been developed heretofore, the pole pieces and the partitions or separators only form a fraction of the active face of the plate in the longitudinal direction, each pole piece and separator extending transversely over the entire width of the magnetic plate.

The magnetic attraction, while excellent in one direction, generally is comparatively poor in a direction perpendicular thereto and thus one must be careful how the workpiece is positioned on the magnetic chuck.

Furthermore, if the article is positioned improperly on the magnetic chuck, it may not be held securely and may create a danger to the machinist, create a problem of machining accuracy, or result in damage to an expensive workpiece.

OBJECTS OF THE INVENTION

Accordingly, it is the principal object of the present invention to provide an improved magnetic retention plate which is devoid of these drawbacks.

Another object of this invention is to provide a magnetic retention plate which has, in the actuated or "on" position, a more uniform magnetization in mutually perpendicular directions than earlier magnetic chucks or worktables.

Still another object of my invention is to provide a magnetic retention plate which is comparatively simple and inexpensive and which provides attractive forces which are uniformly distributed over the workpiece-holding surface or active face of the plate, i.e. can develop a retention effectiveness which is the same in both the longitudinal and the transverse dimensions of the plate.

To this end, the magnetic retention plate of the invention has all of the pole pieces fixed and disposed in a checked pattern of orthogonal rows of pole pieces which preferably are of square cross section parallel to the active face, and are separated by partitions of equal thickness in both longitudinal and transverse directions, the square end pieces of the pole pieces and the edges of the partitions defining the planar retention surface together.

The permanent magnets form an array of fixed permanent magnets located below the partitions in pairs of mutually parallel rows with the fixed permanent magnets of one row of each pair being poled oppositely of the fixed permanent magnets of the other row of the respective pair and being of alternating direction of polarity along the respective row from fixed permanent magnet to fixed permanent magnet therealong. All of the fixed permanent magnets are magnetized parallel to a longitudinal dimension of the plate.

The permanent magnets of the movable array are likewise located below the partitions or in the gaps between the pole pieces in pairs of rows extending in the longitudinal direction and are magnetized in directions which are parallel to the transverse dimension, alternating in polarity as to corresponding permanent magnets of the pair of rows and from permanent magnet to permanent magnet along each row.

The array of movable permanent magnets is displaceable by the actuating mechanism with a distance equal to the pitch of the pole pieces, i.e. the center to center spacing therebetween so that in the first position, movable poles of one polarity are juxtaposed with corresponding sides of the pole pieces whereas the other pair of sides thereof are juxtaposed with fixed magnet poles of opposite polarity so that the magnetic field lines close entirely within the plate. In the second position, however, the surfaces of the pole pieces are each juxtaposed with fixed and movable magnetic poles of the same polarity so that the field lines close through the end faces of the pole pieces externally of the plate.

Of course the permanent magnets arrayed in the transverse direction may be movable rather than fixed and coupled to the actuating mechanism while the permanent magnets arrayed in the longitudinal direction may be fixed although this construction is less desirable.

Consequently, the magnetic retention plate utilizing the permanent magnets in accordance with the present invention has its active face subdivided both longitudinally and transversely by the partitions and in the on or active position, this surface presents longitudinal rows and transverse rows of poles of alternating polarity. The attractive magnetic field is consequently distributed uniformly over the active surface and the retention of workpieces positioned on the plate is therefore just as good in the longitudinal direction as in the transverse direction.

This is particularly advantageous in applications of the magnetic retention plate of the invention which require it to hold workpieces on a machine tool whose operations are to be carried out with movements in the longitudinal as well as in the transverse direction so that forces in both directions are applied to the workpiece.

In addition, the magnetic plate of the invention has a magnetic density which is substantially higher than could be achieved heretofore because the magnets can be of reduced thickness in both directions, especially when the magnets have their magnetic axes parallel to the plate and the partitions.

In one embodiment of the invention, the base plate is composed of a nonmagnetic material and pole pieces are disposed in a checked or grid-like pattern, resting directly upon the nonmagnetic base plate without any danger of a magnetic flux short circuit.

In another embodiment of the invention, however, the base plate is composed of a magnetic material and all of the pole pieces whose end faces are to have one polarity in the on or active state, lie in direct contact with the base plate, whereas all of the pole pieces whose end faces are to be of an opposite polarity in the active state are magnetically insulated from this base plate.

In both embodiments, the pole pieces can have the form of simple rectangular parallelepipedal blocks which can be formed economically and mounted easily in place.

Advantageously, the permanent magnets received between the longitudinal and transverse rows of pole pieces are permanent magnets in the form of axially magnetized disks of small thickness which are received in holes of nonmagnetic members. Either the aforementioned partitions can be fixed or of bars forming these partitions which are displaceable in the air spaces between the longitudinal rows of pole pieces to form part of the actuating means.

These magnets can be cobalt-rare earth magnets and are commercially available in the requisite size and shape without requiring any machining or modification. This of course contributes to the low manufacturing cost of the apparatus of the invention.

The movable bars or members can of course form combs below the separators or partitions at the active surface and it has been found to be advantageous to have these combs or bars formed with racks which engage pinions on a common shaft which can be rotated by a manually operated lever or control arm.

BRIEF DESCRIPTION OF THE DRAWING

The above and other objects, features and advantages of the present invention will become more readily apparent from the following description, reference being made to the accompanying drawing in which:

FIG. 1 is a top plan view of a magnetic retention plate according to the invention using a nonmagnetic base or sole plate;

FIG. 2 is a side elevational view of this magnetic retention plate;

FIG. 3 is a vertical section taken along the line III—III of FIG. 1;

FIG. 4 is a vertical section similar to FIG. 3 showing the magnetic retention plate in its position in which a workpiece can be held on the active surface;

FIG. 5 is a vertical section in a transverse plane taken along the line V—V of FIG. 3;

FIG. 6 is a section corresponding to FIG. 5 showing the positions in the active state of the magnetic chuck;

FIG. 7 is a horizontal section taken along the line VII—VII of FIG. 3;

FIG. 8 is a horizontal section similar to FIG. 7 showing the apparatus in its active position; and FIG. 9 is a section similar to FIG. 5 or FIG. 6 illustrating another embodiment of the invention in which the base plate is composed of magnetic material.

SPECIFIC DESCRIPTION

The magnetic retention plate shown in FIGS. 1-8 comprises a rectangular sole or base plate 1 surmounted by a generally parallelepipedal magnet structure 2. The base plate 1 is composed of a nonmetallic material.

The magnet structure 2 comprises a multiplicity of identical magnetically soft steel pole pieces which are in the form of rectangular parallelepipeds and which are represented at 3 and are disposed in a check or gridwork pattern with horizontal and longitudinal rows.

Each pole piece 3 is square in its horizontal section and rests with its lower face directly upon the nonmagnetic base plate 1 while its upper face forms a corresponding portion of the upper active surface of the magnetic plate. Each of the pole pieces 3 is of uniform cross section over its entire height.

Between the rows of pole positions 3, both in the longitudinal and in the transverse direction are nonmetallic gaps 4' which cross in the pattern of a grill and in which partitions 4 can be received. The partitions can be attached together in an actual grill of nonmetallic material.

The pole pieces 3 along the longitudinal edges of the magnetic plate are separated by lateral downward extensions of this grill as shown at 4" in FIG. 8. At the two ends of the arrays, the pole pieces 3 are not exposed, being enclosed by members 5 and thus forming end closures which constitute a sort of housing on the base plate.

Between the transverse rows of the pole pieces 3 and beneath the partitions 4 separating these rows from one another are fixed permanent magnets 7 and 8 in the form of circular disks of small thickness having their magnetization axes horizontal, i.e. parallel to the base plate 1. Each magnet 7 or 8 is disposed between two pole pieces of each pair of transverse rows of pole pieces and can be received in holes of nonmetallic members or strips or can be bonded directly to the pole pieces as shown.

In each transverse line of magnets, alternating permanent magnets 7, all of which have a magnetization direction parallel to the longitudinal dimension of the magnetic plate and are magnetized in the same sense, alternate with permanent magnets 8 which are likewise magnetized in the longitudinal direction of the plate but in the opposite sense from the magnet 7.

As a consequence, each magnetic pole piece is juxtaposed with one magnet 7 and one magnet 8 and each pair of rows, the magnets being magnetized in opposite senses but presenting pole faces of the same polarity of the respective pole piece. The pole pieces in both the longitudinal and in the transverse directions thus alternate in polarity at their end faces by reason of the double alternation of the polarities of the pole pieces 7 and 8 (see especially FIGS. 3 and 8).

Between the longitudinal rows of pole pieces 3 and beneath the partitions 4 therebetween, vertical air gaps extending parallel to the longitudinal dimension of the plate are formed. Within these air gaps, movable combs or bars 11 of nonmetallic material, are slideably mounted in these air spaces.

Each comb 11 has a series of circular openings or holes receiving the respective movable permanent magnets 9 and 10, which like the fixed permanent magnets 7 and 8 can be cobalt-rare earth magnet disks of small thickness with horizontal axes.

The center to center spacing or pitch of the movable permanent magnets 9, 10 is equal to the center to center spacing or pitch of the pole pieces.

Along each row of permanent magnets corresponding to the permanent magnets of a respective pair 11, the magnets 9 poled magnetically parallel to the transverse dimension of the plate alternate with the permanent magnet 10 which are likewise poled parallel to the transverse dimension but are opposite in polarity to the permanent magnets 9 with which they alternate.

The bars 11 are displaceable longitudinally simultaneously by a distance of one polar pitch by an actuating mechanism 12 disposed at one end of the magnetic retention plate, i.e. beneath the housing member 5.

Specifically, the actuating mechanism 12 can comprise a rotatable transverse shaft 13 actuatable by an arm or lever 14 connected to the shaft at one of its ends and lying externally to permit manipulation by the tool operator.

On the shaft 13, there are provided pinions 15 which may be individual sets of teeth or actual gears mounted on the shaft, meshing with racks 16 formed on a corresponding end of each bar 11.

Upon rotation of the shaft 13 by a swing of the lever 14 through 180° (half rotation), the movable permanent magnets can be displaced by one pole pitch from the off position shown in FIGS. 3 and 5 to the on positions represented in FIGS. 4 and 6.

The several bars 11, being thus coupled by the actuating mechanism 12, always occupy corresponding positions so that their respective rows of permanent magnets 9 and 10 are always aligned transversely as well as longitudinally, the permanent magnets 9 and 10 alternating in both the longitudinal and transverse directions as to their polarity (FIGS. 3 and 8).

For flux equilibrium, the fixed permanent magnets 7 and 8 or the pole pieces at the boundaries of the retention plate and the corresponding permanent magnets can be dimensioned differently from those within the interior of the plate, but in all cases should be disks whose diameters can be varied as required to maintain flux equilibrium (compare the diameters of the disks at the ends of the arrays shown in FIGS. 3 and 6).

The permanent magnets 7, 8, 9, 10 are preferably samarium-cobalt permanent magnets having a high coersive force with a magnetic remanance of 8000 to 9000 gauss, and a field strength of 7800 to 9000 oersted.

FIGS. 3, 5 and 7 show the magnetic plate in its off position, the bars 11 being shifted relatively to the left (FIG. 3) so that the movable permanent magnets which register with each pole piece present faces to it which are of a polarity opposite that presented by the fixed permanent magnets to the corresponding faces of the pole piece 3. As a result, the magnetic flux lines close as represented at 17 entirely within the body 2 and the faces of the pole pieces 3 at the surface of this body are devoid of magnetic flux, i.e. are neutral. The pole pieces 3 along the edges of the body 2 and also be neutralized by appropriate dimensioning of the three magnets juxtaposed with each pole piece in this region.

Upon displacement of the bars 11 to the right (FIG. 8), the apparatus is brought into its on or attractive state (FIGS. 4, 6 and 8) so that each pole piece 3 has its vertical sides confronted by magnetic poles which are all identical. As a consequence, the magnetic flux lines close as shown at 18 only externally through the active fact (FIGS. 4 and 6). Since the plate 1 is nonmagnetic in these embodiments, there is no risk of a magnetic flux short circuit.

FIG. 9 shows an embodiment wherein the plate 101 is magnetic and there are two sets of pole pieces 3a and 3b which alternate with one another in the longitudinal and transverse rows.

In this case, all of the pole pieces 3a which will have the same polarity at their active end faces, e.g. a north pole N, lie in direct contact with the magnetic plate 101.

To avoid short circuiting in this case, the pole pieces 3b which would have the opposite polarity at their active faces in the on state, i.e. south pole S, are separated from the magnetic plate by nonmagnetic spacers 19. The principle of operation of this embodiment, of course, is the same as that which has already been described.

The apparatus can be modified within the spirit and scope of the appended claims without deviating from the principles of the invention, e.g. by changing the magnet materials or the construction of the actuating mechanism, within the inventive concept.

I claim:

1. In a magnetic retention plate for selectively retaining a magnetically attractable body thereon, said magnetic retention plate comprising a planar array of pole pieces, end faces of said pole pieces defining a planar retention surface, an array of fixed permanent magnets magnetized in a common direction and positioned to apply a magnetic field to said pole pieces, an array of movable permanent magnets magnetized in a direction perpendicular to said common direction, an actuating mechanism for the translational displacement of said array of movable permanent magnets for displacing said movable permanent magnets relative to said fixed permanent magnets between a first position in which lines of force of said arrays of permanent magnet close within the interior of said plate, and a second position wherein lines of force of said arrays close externally of said plate through said end faces of said pole pieces, the improvement wherein:

all of said pole pieces are fixed, disposed in a checked pattern of orthogonal rows of pole pieces, and separated by partitions having edges defining said planar retention surface with said end faces;

the permanent magnets of said array of fixed permanent magnets are located below said partitions in pairs of mutually parallel rows with the fixed permanent magnets of one row of each pair being poled oppositely to the fixed permanent magnets of the other row of the respective pair and being of alternating direction of polarity along the respective row from fixed permanent magnet to fixed permanent magnet therealong, all said fixed permanent magnets being magnetized parallel to a longitudinal dimension of said plate;

the permanent magnets of said array of movable permanent magnets are located below said partitions in pairs of mutually parallel rows with the movable permanent magnets of one row of each pair being poled oppositely to the movable permanent magnets of the other row of the respective pair and being of alternating direction of polarity along the respective row from movable permanent magnet to movable permanent magnet therealong, all said movable permanent magnets being magnetized parallel to a transverse dimension of said plate;

each of said pole pieces has four sides, a first two opposite sides of which are juxtaposed with faces of the fixed permanent magnets of the same polarity and another two opposite side of which are flanked by a said pair of rows of said movable permanent magnets; and said actuating mechanism is constructed and arranged to displace said movable permanent magnets by a stroke corresponding to a pitch of separation of said pole pieces parallel to said longitudinal dimension whereby in said first position faces of opposite movable permanent magnets are juxtaposed with said other two opposite sides and have opposite polarity to the fixed magnet faces juxtaposed with the first two opposite sides of each pole piece, and whereby in said second position faces of opposite movable permanent magnets are juxtaposed with said other two opposite sides and have the same polarity as the fixed magnet faces juxtaposed with the first two opposite sides of each pole piece.

2. The improvement defined in claim 1 wherein said pole pieces are mounted on and are directly in contact with a nonmagnetic base plate at least coextensive with said planar array of pole pieces.

3. The improvement defined in claim 1 wherein said array of pole pieces is provided on a magnetic base plate at least coextensive therewith, alternate ones of said pole pieces in said array of pole pieces being directly in contact with said base plate and being magnetically insulated therefrom.

4. The improvement defined in claim 1 wherein each of said permanent magnets is an axially magnetized circular disk.

5. The improvement defined in claim 4 wherein said actuating mechanism includes respective bars below said partitions extending parallel to the longitudinal dimension and in air gaps between respective rows of said pole pieces, said bars being formed of nonmagnetic material and being provided with holes receiving said movable permanent magnets; and means for simultaneously displacing all of said bars.

6. The improvement defined in claim 5 wherein said means for simultaneously displacing all of said bars includes a rack formed on said bars, a respective pinion meshing with each of said racks, a common shaft carrying said pinions, and a lever connected to said shaft for rotating same.

* * * * *